June 11, 1935.  E. H. WHITE  2,004,622
REMOTE CONTROL REGULATOR MOTOR
Filed Sept. 24, 1930   3 Sheets-Sheet 1
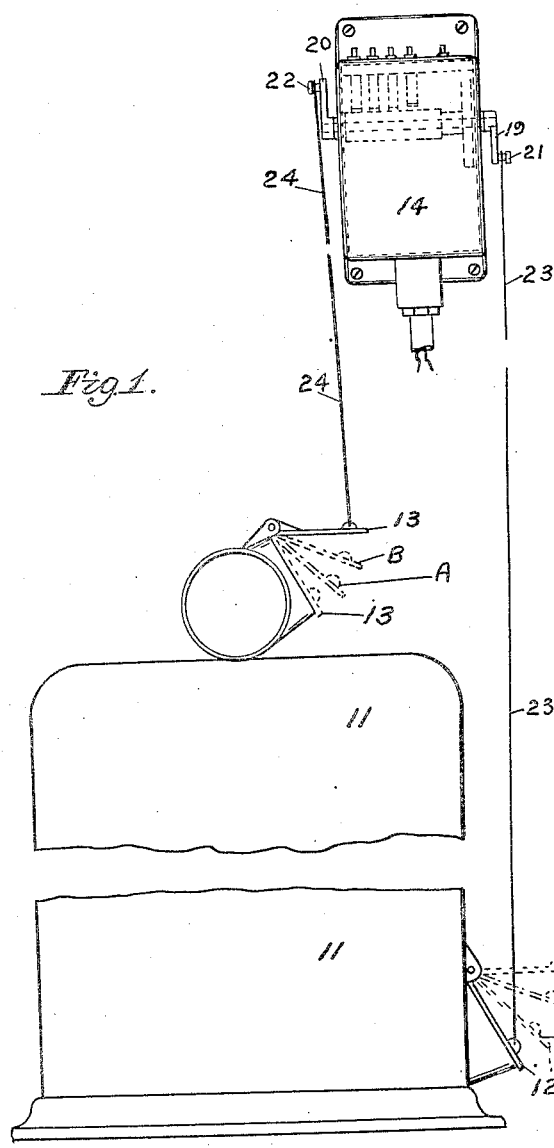
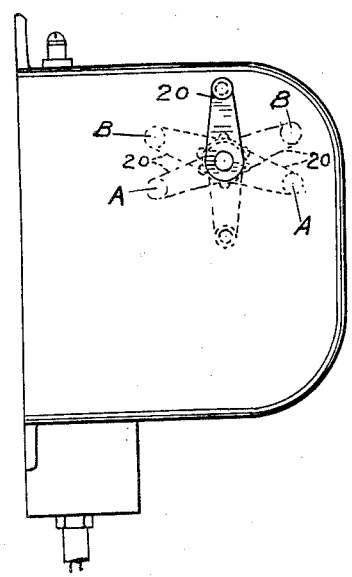
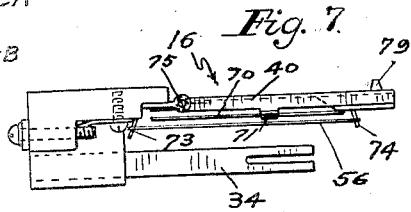
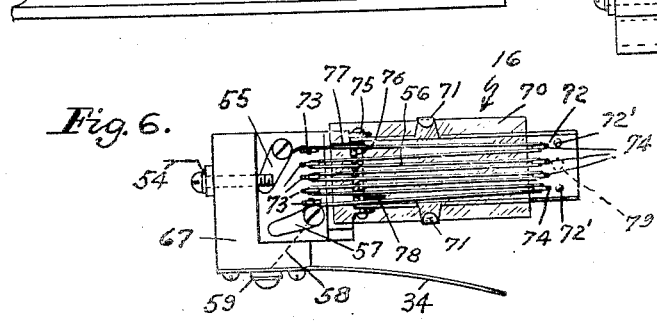
Inventor
EVERETT H. WHITE
By
Reif & Braddock
Attorneys

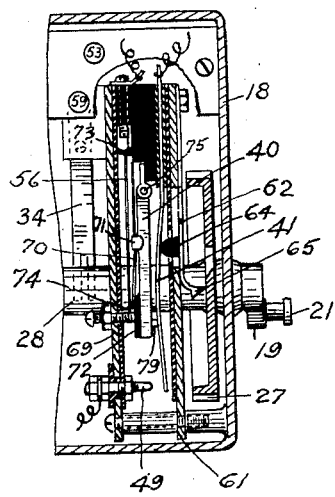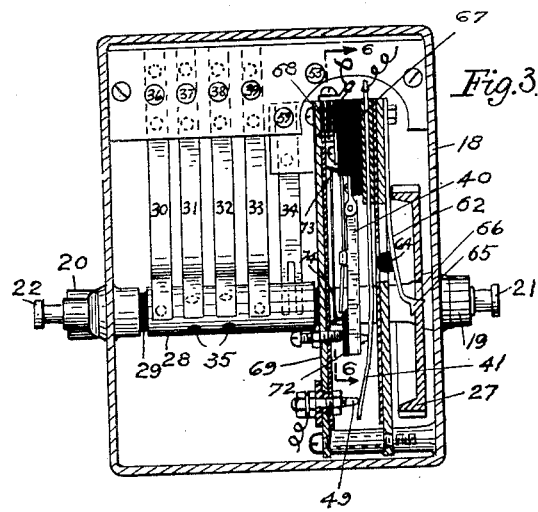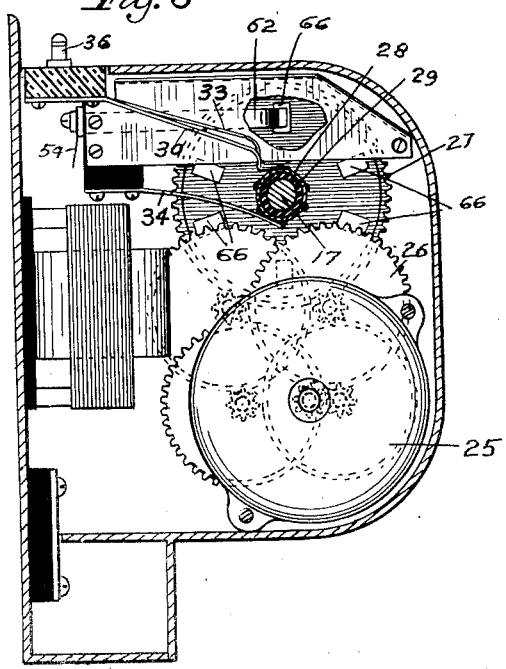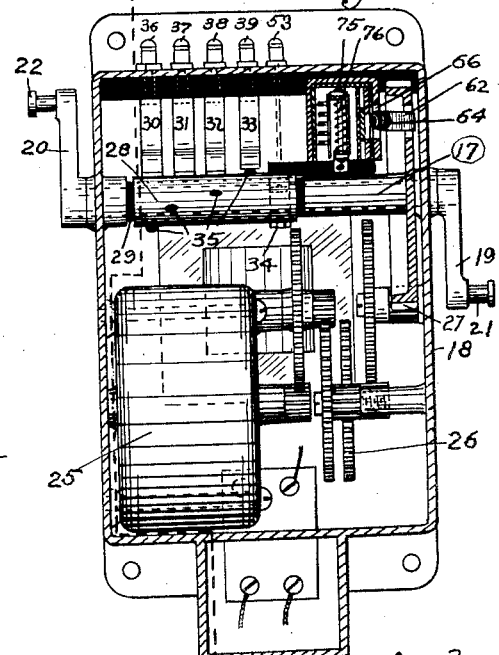

June 11, 1935.     E. H. WHITE     2,004,622
REMOTE CONTROL REGULATOR MOTOR
Filed Sept. 24, 1930     3 Sheets-Sheet 3

Inventor
EVERETT H. WHITE
By
Reif & Braddock
Attorneys

Patented June 11, 1935

2,004,622

UNITED STATES PATENT OFFICE 2,004,622

REMOTE CONTROL REGULATOR MOTOR

Everett H. White, St. Paul, Minn.

Application September 24, 1930, Serial No. 484,108

11 Claims. (Cl. 172—239)

This invention relates to electrically operated mechanisms for the remote control of devices which require motive power to effect their operation, as, for example, heating plant dampers; steam, water, oil, or gas valves; circulating fans or blowers; and intake and mixing valves.

Mechanisms for the remote control of devices operated by motive power have heretofore sometimes included electro-magnets as the actuating means for the regulator motor switches, and sometimes included heating elements for this same purpose. In each case where such a mechanism has employed an electro-magnet for actuating a regulator motor switch, the electro-magnet circuit has of necessity carried an inductive operating current of sufficiently large magnitude to cause arcing and to thus in time pit the more delicate types of switch elements, such as thermostatic switches or devices, controlling said electro-magnet circuit. In each case where such a mechanism has employed a heating element for actuating a regulator motor switch, a resistance has been used to supply heat to an expansible element, such as a thermostatic or bimetallic blade, or a chemically charged diaphragm, in the regulator motor circuit, with a consequent objectionable slowness of action of the regulator motor switch due to the fact that the electrical current has had to be applied to said resistance and the resultant heat transferred from the resistance to the expansible element by absorption.

An object of the present invention is to provide an electrically operated mechanism for the remote control of a device operated by motive power, which will include a thermal starting switch of novel and improved construction for the regulator motor controlling said device.

Another object is to provide a thermal starting switch, preferably non-inductive, for the regulator motor of a device to be remotely controlled, which thermal starting switch can be operated by an electrical current of insufficient capacity to cause arcing tending to pit or otherwise mar instruments, such, for example, as thermostatic elements or switches, incorporating delicate and fine electrical contacts and included in an electrical circuit controlling said thermal starting switch.

Another object is to provide a thermal starting switch for the regulator motor of a device to be remotely controlled, which thermal starting switch will be directly responsive in its operation to expanding and contracting actions of a resistance element of said thermal starting switch, whereby to eliminate necessity for transfer of heat by absorption to the starting switch as heretofore required in mechanisms employing heating elements for actuating motor switches.

Another object is to provide an electrically operated mechanism for the remote control of a device or devices operated by motive power, wherein will be incorporated a thermal starting switch, responsive in its operation to an expansible and contractible resistance element included in an electrical circuit having a remote controlling instrument, adapted to close an operative circuit for a regulator motor, and wherein flow of current through the circuit including said remote controlling instrument and said resistance element will be interrupted, in novel and improved manner and independently of said remote controlling instrument, immediately upon the setting into operation of said regulator motor.

And yet another object is to provide an electrically operated mechanism for the remote control of a device or devices requiring motive power to effect their operation, which will include a regulator motor adapted to be associated with said device or devices and having various features and characteristics constituting novel and improved structure in mechanisms of the present character; will also include means, desirably a resistance element, arranged in an electrical circuit having a remote controlling instrument, for manipulating a thermal starting switch of the operating circuit of said regulator motor in novel and improved manner to close said operating circuit; and wherein presence of current in the circuit including said remote controlling instrument and said means or resistance element will be discontinued, preferably by mechanical actuation of certain of the operative elements of said regulator motor and independently of said remote controlling instrument, immediately upon the setting of the regulator motor into operation, whereby to render the starting circuit dead the instant the regulator motor commences to operate.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a front elevational view of a remote control regulator motor made according to the principles of the invention, disclosing said regulator motor as when applied to use to control the draft and the check of a heating furnace which is conventionally shown;

Fig. 2 is an enlarged end elevational view of the regulator motor as seen from the left in Fig. 1;

Fig. 3 is a horizontal sectional view of the regulator motor casing, showing operating parts of said regulator motor in plan and in section, and the thermal starting switch in edge elevation;

Fig. 4 is a vertical sectional view of the regulator motor casing, showing operating parts of said regulator motor in section and in elevation, and the thermal starting switch in section;

Fig. 5 is a vertical, sectional view of the regulator motor, taken as on line 5—5 in Fig. 4, with parts broken away and in section;

Fig. 6 is an elevational view of the thermal starting switch of the regulator motor, as it would appear on line 6—6 in Fig. 3;

Fig. 7 is an edge view of said thermal starting switch, as seen from above in Fig. 6;

Fig. 9 is a detail view of the thermal starting switch and other parts of the electrically operated mechanism in positions assumed in operation.

Figure 8:
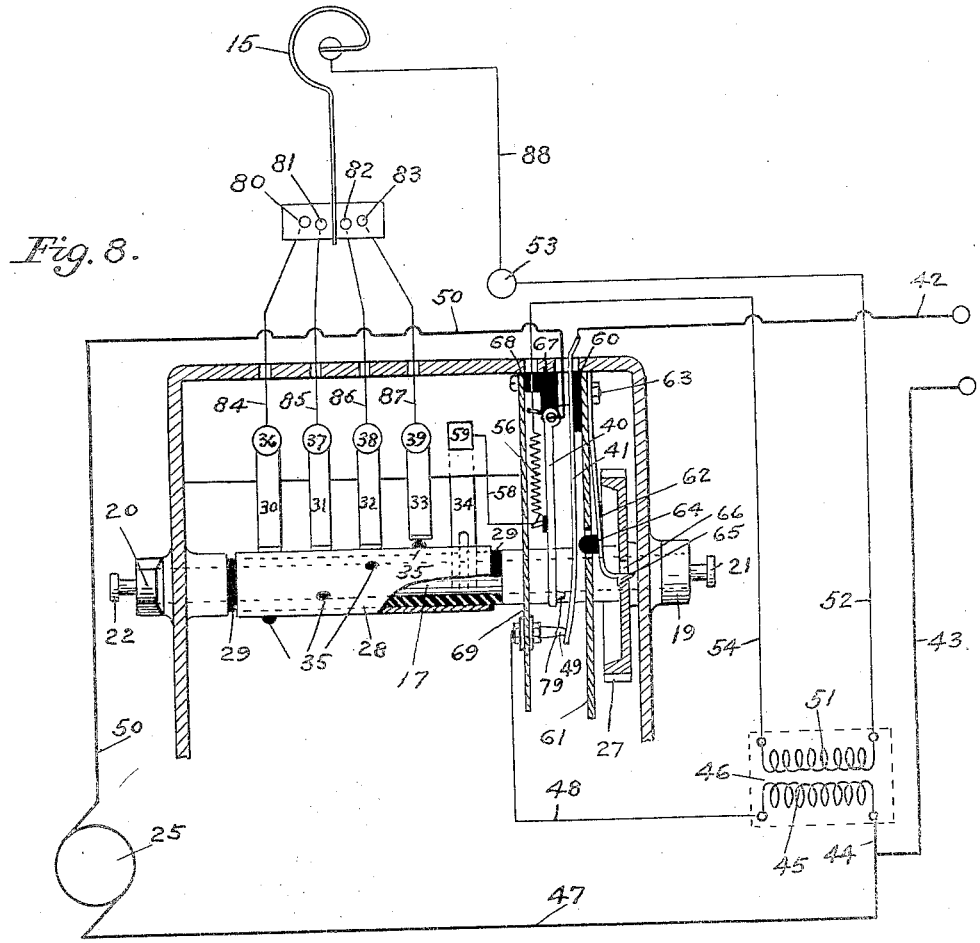
Fig. 8 is a diagrammatic view disclosing the wiring system of the electrically operated mechanism.

With respect to the drawings and the numerals of reference thereon, 11 represents a heating furnace including a draft damper 12 and a check damper 13. The regulator motor, indicated generally at 14, is shown applied to said furnace to regulate said draft damper and check damper, although, as will become obvious, said regulator motor can be applied to control any other devices requiring motive power to effect their operation, as, for example, valves controlling flow of steam, water, oil, gas, or other fluid; circulating fans or blowers; and intake and mixing dampers.

An ordinary thermostatic element 15, in remote relation to the furnace 11, as, for instance, in a room to be heated, is shown as a means for actuating the starting switch, as disclosed a thermal starting switch 16, for the regulator motor 14, but, as will also become obvious, different actuating means, such as mechanically propelled elements, for the starting switch can be substituted for the thermostatic element illustrated.

The regulator motor 14 includes a driven or actuating shaft 17, which is suitably mounted in a casing 18 for the regulator motor, carrying crank arms 19 and 20 at its opposite ends and disposed outside of the casing 18, said crank arms 19 and 20 desirably extending in straight-angle relation to each other. Each crank arm 19 and 20 carries an outwardly extending headed pin, denoted 21 and 22, respectively, the pin 21 rotatably supporting a manipulating member, cord or rod 23 suitably attached to an outer portion of the draft damper 12, and the pin 22 rotatably supporting a manipulating member, cord or rod 24 suitably attached to an outer portion of the check damper 13.

When the crank arms 19 and 20 are positioned as in Fig. 1, so that the crank arm 19 extends vertically downward and the crank arm 20 extends vertically upward, the draft damper 12 is completely closed by gravity and the check damper 13 is held wide open. When the positions of said crank arms are reversed, so that the crank arm 19 extends vertically upward and the crank arm 20 extends vertically downward, the draft damper 12 is held wide open and the check damper 13 is completely closed by gravity. When the crank arms 19 and 20 are disposed between their vertical positions, both the draft damper and the check damper are held partially open to extents depending upon the angular positions of said crank arms, as will be evident.

It is the function of the thermostatic element 15, or other remote actuating means (not shown), to close an electrical circuit controlling the thermal starting switch 16, which switch in turn closes the switch of a circuit including the regulator motor 14 to cause said regulator motor to be operated in response to the closing of the electrical circuit controlling said thermal starting switch 16, to situate the driven or actuating shaft 17 in one of the several positions of the crank arms 19 and 20 indicated in full and dotted lines in Fig. 2, and to as a consequence situate the draft damper 12 and the check damper 13 in one of the positions in which each of said dampers is indicated in full and dotted lines in Fig. 1.

As shown more clearly in Figs. 3, 4, 5, 8 and 9, the casing 18 suitably supports an electric motor 25 which is drivingly connected by reducing gearing, represented generally at 26, to the driven or actuating shaft 17, said reducing gearing including a gear 27 fixed to said driven or actuating shaft 17. The actuating shaft 17 carries a circuit breaker drum 28 which is suitably insulated from said driven or actuating shaft as indicated at 29. A circuit breaker consists of a number of conducting clips 30, 31, 32, 33 and 34 which make contact with the circuit breaker drum, and the conducting clips 30, 31, 32 and 33 are raised and lowered, as the drum rotates, by small insulating buttons 35 upon the circuit breaker drum, there being at least one insulating button 35 for each clip 30, 31, 32 and 33. The clips 30, 31, 32 and 33 are connected to terminals 36, 37, 38 and 39, respectively.

A motor switch consists essentially of two blades, designated 40 and 41, the blade 40, together with other elements to be described, constituting the thermal starting switch 16. Incoming wires 42 and 43 lead to the motor. As shown, the wire 42 is connected to the motor switch blade 41 while the wire 43 is connected to a wire 44 leading to one side of the primary 45 of a transformer 46 and to a wire 47 leading to one side of the motor 25. The other side of the primary 45 is connected by a wire 48 to a stationary contact 49 for the blade 41, and the other side of the motor 25 is connected by a wire 50 with the blade 40 of the motor switch.

One side of the secondary 51 of the transformer 46 is connected by a lead wire 52 with a terminal 53, while the other side of said secondary is connected by a lead wire 54 with one terminal 55 of a resistor 56 of the thermal starting switch 16 and supported upon the motor switch blade 40. The terminal 57 of the resistor 56 opposite the lead wire 54 is connected by means of a lead wire 58 with a terminal 59 for the conducting clip 34. The blade 41 is insulatively attached as at 60 upon a support 61 in the casing 18. A resilient finger 62 attached to said support at 63 carries an insulating protuberance 64 movable in an opening through said support 61, and said finger also carries a projection 65 ridable in slots or openings 66 in the gear 27. See Figs. 5, 8 and 9.

When the electric motor is at rest, the blades 40 and 41 are positioned as shown in Fig. 8. The arrangement is such that whenever current flows in the resistor 56, the blade 40 moves to the right in said Fig. 8 and makes contact with the blade 41. Said blade 41 is operated by the gear 27. The slots or openings 66 which are placed in said gear 27 at proper intervals allow the resilient blade 41 to move over to the right in said Fig. 8 as said slots or openings 66 pass under the projection 65. At other times, said projection rides on the face of the gear 27 to cause the blade 41 to take the position as shown in Fig. 9; that is to say, to maintain engagement between the blades 40 and 41 and to break engagement between said blade 41 and the stationary contact 49.

The resistor 56 desirably consists of a single strand of suitable wire of relatively fine dimension having its end portions attached to the terminals 55 and 57, respectively, mounted upon an insulating block 67 itself conveniently carried, as at 68, in the motor casing 18, adjacent the blade 41, upon a support 69 in spaced relation to the support 61 and also carrying the stationary contact 49. The intermediate portion of the wire strand resistor 56 extends back and forth across the outer face of a mica sheet 70 conveniently fixed, as at 71, to the face of the blade 40 opposite the blade 41, and outer parts of said intermediate portion of the wire strand, in spaced relation to the terminals 55 and 57, are rigidly attached to a small insulating block 72 itself suitably fastened, as at 72', to the outer, free end of said blade 40, against the face thereof opposite the blade 41. More specifically, the insulating block 67 supports a series of aligning, spaced apart metallic lugs or posts 73, and the insulating block 72 supports a similar series desirably including an equal number of aligning, spaced apart metallic lugs or posts 74, about all of which lugs or posts 73 and 74 the wire strand is successively wound. In the manufacture of the thermal starting switch 16, an end of the wire strand resistor 56 thereof may be first attached to a terminal 55 or 57, an adjacent portion of said wire strand may then be wound one or more times about an outermost lug or post 73, then the next adjacent portion of the wire strand may be wound about an outermost lug or post 74, then about the lug or post 73 next adjacent one already wired, then about the lug or post 74 next adjacent one already wired, and so on, until the lugs or posts are all wired, and finally the wire strand may be attached to the other terminal 57 or 55.

The blade 40 is conveniently pivoted to the insulating block 67, as by a small shaft 75 which passes through ears upon said blade 40 and said insulating block 67, and a coil spring 76 upon the small shaft 75 includes a projecting end 77 in engagement with the insulating block 67 and a projecting end 78 in engagement with the blade 40, the function of said coil spring and its projecting ends 77 and 78 being to urge said blade 40 to swing on its axis toward the blade 41, whereby a contact 79 of the blade 40 can engage the blade 41. See Figs. 3 and 9. Each length of the wire strand resistor 56 is taut or tensioned between the lugs or posts 73 and 74 to normally hold the blade 40, against the action of the coil spring 76, out of engagement with the blade 41, and so that said blade 40 and the insulating block 72 thereon will desirably be in approximate alinement with the insulating block 67. And the wire strand resistor 56, evidently non-inductive, is composed of material having a coefficient of expansion sufficiently great to cause immediate lengthening of said wire strand resistor to an extent to allow the contact 79 to engage the blade 41 immediately when only a very small charge of electricity is applied to said resistor in a manner to be explained. In practice, application to said resistor of four watts, or even less, of operating current is quite sufficient to cause engagement between the blades 40 and 41.

The regulator motor operates in the manner as follows. As shown in Fig. 8, said motor is in an inoperative position indicated by the conductor clip 33 which is separated from the circuit breaker drum by an insulating button 35. When connection is now made from terminal 53 to any one of the terminals 36, 37 or 38, the secondary circuit of the transformer is closed through the resistor 56, which allows blade 40 as in Fig. 8 to move to the right, in the manner as set forth, and make contact with blade 41 at 79. This closes the circuit to the electric motor 25, which sets the circuit breaker drum and the gear 27 in motion. The circuit through the resistor is from the secondary 51 of the transformer through lead wire 54 to said resistor, from the resistor by lead wire 58 to conductor clip 34 through terminal 59, through the circuit breaker drum 28 and to the terminal 53 by the particular connection made, and back to the secondary 51 through lead wire 52. The motor circuit is from lead in wire 42 to blade 41, to contact 79 and blade 40, through lead wire 50 to motor 25, and by lead wire 47 to lead in wire 43. As soon as the gear 27 starts to rotate, it causes the projection 65 upon the finger 62 to ride up out of the corresponding slot or opening 66 and force the blade 41 over to the left as shown in Fig. 9, to hold engagement between the blades 40 and 41 at 79 and break engagement between the blade 41 and the stationary contact 49. The breaking of engagement between the blade 41 and the stationary contact 49 opens the primary side of the transformer and cuts the current off of the resistor 56, as will be apparent. The electric motor operates until the projection 65 drops into the next slot or opening 66 in the gear 27. The control motor will then stop if it is in the position called for by the particular connection made between the terminal 53 and one of the terminals 36, 37 or 38. If the regulator motor is not in such position, the cycle will be repeated. That is to say, if terminal 53 is connected to terminal 37, for example, the motor will operate until clip 31 is raised by an insulating button on the circuit breaker drum 28. The driven or actuating shaft 27 will remain in the position at which thus set by the motor until connection is made between said terminal 53 and one of the other terminals 36, 38 or 39.

As shown very clearly in Fig. 8, the thermostatic element 15, which is a bimetallic blade, includes a lower portion adapted to wipe over spaced apart terminals, designated 80, 81, 82 and 83. The terminal 36 is connected to the terminal 80 by a lead wire 84, the terminal 37 is connected to the terminal 81 by a lead wire 85, the terminal 38 is connected to the terminal 82 by a lead wire 86, and the terminal 39 is connected to the terminal 83 by a lead wire 87. The terminal 53 is connected to the bimetallic element 15 by a lead wire 88.

Also in Fig. 8, the regular motor is positioned with the parts disposed as in full lines in Fig. 1, the crank arm 19 extending vertically downward to allow the draft damper 12 to be completely closed, and the crank arm 20 extending vertically upward to cause the check damper 13 to be wide open. In said Fig. 8, the conductor clip 33 is shown resting upon its corresponding insulating button 35. To cause the regulator motor to assume its position of closed draft damper and open check damper, the bimetallic blade 15 had to contact with the terminal 83, and after said blade 15 and said terminal 83 engaged each other, the regulator motor remained in this position called for by the thermostat 15, unless and until said thermostat engaged one of the other terminals 80, 81 or 82. When then said thermostat 15 engages one of said other terminals, electrical connection is made between the terminal 53 and a terminal 36, 37 or 38, as the case may be. Supposing that with the regulator motor positioned as in Fig. 8, the bimetallic blade 15 next engages the terminal 80, electrical connection is made from the terminal 53 to the terminal 36 through the lead wire 88, the blade 15, said terminal 80, and the lead wire 84. Such connection causes the regulator motor to advance and to stop, in the manner as already set forth, when the conductor clip 30 rides its corresponding insulating button 35. As disclosed, the insulating button 35 which is beneath the conductor clip 30 is disposed upon the circuit breaker drum 28 at location diametrically opposite the insulating button 35 beneath the conductor clip 33, so that when the shaft 17 stops at position where the corresponding insulating button 35 elevates the conductor clip 30 from the circuit breaker drum 28, the draft damper is held wide open and the check damper is completely closed by gravity. The regulator motor again remains stationary until the blade 15 contacts with one of the terminals 81, 82 or 83, and when the new contact is made, the regulator motor advances and stops at the corresponding position. As shown, there is a single insulating button for each of the conductor clips 30 and 33 and two insulating buttons for each of the conductor clips 31 and 32, the insulating buttons for said conductor clip 31 desirably being set at about 70° from the insulating button for the conductor clip 30, at opposite sides thereof, and the insulating buttons for said conductor clip 32 desirably being set at about 70° from the insulating button for the conductor clip 33, at opposite sides thereof, so that insulating buttons for the conductor clips 31 and 32 and at the same side of the circuit breaker drum are desirably spaced about 40° apart. For each insulating button 35 there is a corresponding slot or opening 6 in the gear 27. The purpose of the pair of insulating buttons 35 for the conductor clips 31 and 32, respectively, will be obvious. The conductor clip 31 is for causing the regulator motor to be positioned to situate the crank arm 20 in one of the two dotted line positions A in Fig. 2, (the crank arm 19 naturally being oppositely positioned), either of which positions A causes the draft damper and the check damper to reach their intermediate dotted line positions, also indicated A in Fig. 1. The conductor clip 32 is for causing the regulator motor to be positioned to situate the crank arm 20 in one of the two dotted line positions B in said Fig. 2, (the crank arm 19 being oppositely positioned), either of which positions B causes the draft damper to reach its lower dotted line position and the check damper to reach its upper dotted line position, also indicated B in said Fig. 1. The spacing of the insulating buttons 35 with relation to each other in the manner as illustrated and described, it has been found, can cause the draft damper and the check damper to be manipulated from open to closed and from closed to open position in equal step by step stages. That is to say, said draft damper and said check damper may desirably each be capable of having four stationary positions, including a closed condition, a wide open condition, a two-thirds open condition, and a one-third open condition, as shown very clearly by the full and dotted line positions of said dampers in Fig. 1. It could of course be the function of a mechanically propelled actuating element substituted for the element 15 to successively make connection between the terminal 53 and each of terminals, such as 36, 37, 38 and 39, or a greater or a less number of terminals than four, to cause an electric motor, such as the motor 25, to be successively operated to advance the driven or actuating shaft 17 step by step and cause it to stop after advanced, and thus sequentially position manipulating elements, such as the crank arms 19 and 20, associated with said driven or actuating shaft to successively situate operating elements of a mechanism to be controlled at locations necessary to the carrying out automatically of related steps in said mechanism to the performance of an intended function or result, as will be understood.

In any event, manipulating elements suitable to a particular purpose can be substituted for the crank arms 19 and 20, it being apparent that different types of devices, such as valves, blowers, etc., to be remotely controlled and requiring motive power to effect their operation, may have to be associated with the driven or actuating shaft, such as 17, of a regulator motor in a manner entirely different from that of associating the draft damper 12 and the check damper 13 with the driven or actuating shaft 17 as illustrated and described.

Figure 10:
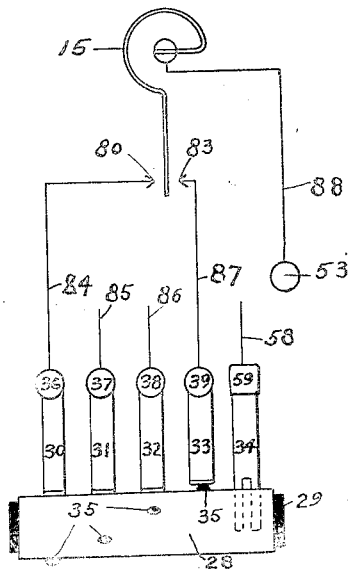
Fig. 10 is a diagrammatic view, agreeing generally with the disclosure of Fig. 8, showing a modified type of electrically operated mechanism made according to the invention.

In Fig. 10 I have illustrated a modified type of electrically operated mechanism made according to the invention. The disclosure of said Fig. 10 is in all respects like the disclosure already described, except that a draft damper 12 and a check damper 13 when employed with the present mechanism are each capable of open and closed positions only, the positions corresponding to those in Fig. 8 when the conductor clip 30 or the conductor clip 33 is elevated from its corresponding insulating button. To accomplish this end, only two operative conductor clips, shown as 30 and 33 in Fig. 10, together with a common conductor clip, shown as 34, are required, as are also only two thermostat terminals 80 and 83, functioning in the precise manner as already described in connection with Figs. 1 to 9. While I have shown conductor clips 31 and 32 in the disclosure of Fig. 10, as well as insulating buttons therefor, said conductor clips 31 and 32 are disconnected from the remainder of the mechanism, perform no function whatsoever, and could be omitted altogether. They do, however, make it plain that the regulator motor of Fig. 8 for operating the draft damper 12 and the check damper 13 to open, closed and intermediate positions, can be converted into a motor for operating said draft damper and said check damper to open and closed positions only by merely breaking electrical connection between the terminals 31 and 81 and the terminals 32 and 82, respectively.

It will be appreciated that the employment of a thermal starting switch, such as 16, which is directly responsive in its operation to expanding and contracting action of a resistance element, such as 56, itself expanding and contracting immediately upon receiving flow of current, makes provision in the present electrically operated mechanism for efficient operation of a regulator motor circuit control switch practically instantaneously with the closing of the circuit controlling said thermal starting switch. Employment of the non-inductive resistance element 55, in the manner as fully set forth, allows operation of the thermal starting switch by means of a controlling circuit therefor which incorporates very delicate and fine electrical contacts, for the reason that the operating current required by the resistance element to accomplish actuation of the thermal starting switch of the invention does not have to exceed four watts, which, flowing through a non-inductive circuit, causes practically no arcing whatever at the controlling instrument contacts, such as those made between the terminals 80, 81, 82 and 83 and the bimetallic blade 15. The arrangement as herein disclosed and described is a great and valuable improvement over arrangements heretofore in vogue for such work as temperature regulation and humidity control, and my present arrangement is also being found to be invaluable for a variety of other uses.

One of the important features of my electrically operated mechanism which should be particularly noted, is the unique mechanical arrangement of operating elements of the regulator motor, especially in conjunction with the thermal starting switch, making it necessary for the remote controlling instrument, such as the thermostatic element 15, to only close the starting circuit of the regulator motor without having to open said starting circuit. Said arrangement is such that current ceases to flow in the regulator motor starting circuit as soon as the gear train is set in motion, by reason of mechanical actuation of the starting switch causing the circuit at the primary winding of the transformer, supplying the energy to the starting switch, to be opened.

Another valuable feature of the present remote control regulator motor as a whole is that its mechanical arrangement is such that by adding circuit breaker clips and control or regulator circuit terminals, the number of stops of the regulator motor can be increased or decreased without necessity for material changes in the general mechanism.

What I claim is:—

1. In an electrically operated mechanism for the remote control of a device requiring motive power to effect its operation, a motor for regulating said device, an operating electrical circuit for said motor including a motor starting switch, a transformer, a primary circuit for said transformer, a remotely controlled electrical circuit including the secondary of said transformer, means in said remotely controlled electrical circuit for closing said motor starting switch, and means operative upon the setting of said regulator motor into operation to break the primary circuit of said transformer and thus discontinue flow of current in said remotely controlled electrical circuit, said last mentioned means maintaining the motor starting switch closed.

2. In an electrically operated mechanism for the remote control of a device requiring motive power to effect its operation, a motor for regulating said device, an operating electrical circuit for said motor including a motor starting switch having a movable element, a transformer, a primary circuit for said transformer, a remotely controlled electrical circuit including the secondary of said transformer, means including an expansible and contractible resistance element for opening and closing said motor starting switch, said resistance element being arranged in said remotely controlled electrical circuit to retain said movable element of the motor starting switch in a withdrawn position when said remotely controlled circuit is open and said resistance element is as a result contracted, and to allow said movable element of the motor starting switch to move to position closing said motor operating circuit when said remotely controlled circuit is closed and said resistance element is as a result expanded, and means operative upon the setting of said regulator motor into operation to break the primary circuit of said transformer and thus render said remotely controlled electrical circuit dead, said last mentioned means maintaining the motor starting switch closed.

3. In an electrically operated mechanism for the remote control of a device requiring motive power to effect its operation, a motor for regulating said device, an operating electrical circuit for said motor including a motor starting switch having a pair of relatively movable elements, a transformer, a primary circuit for said transformer, a remotely controlled electrical circuit including the secondary of said transformer, means in said remotely controlled electrical circuit for actuating one of the movable elements of said motor starting switch to the closed position of said motor operating circuit, and means operative upon the setting of said regulator motor into operation to actuate the other of said movable elements of the motor starting switch to break the primary circuit of said transformer and thus render said remotely controlled circuit dead, said last mentioned means maintaining the motor starting switch closed.

4. In an electrically operated mechanism for the remote control of a device requiring motive power to effect its operation, a motor for regulating said device, an element having a plurality of separate contacts and a circuit closing member for selectively engaging said contacts, a drum of conducting material driven by said motor, a plurality of conducting members normally engaging said drum, there being a conducting member corresponding to each one of said separate contacts of said element and electrically connected thereto, a circuit for said motor, means for closing said motor circuit upon engagement of said circuit closing member with one of said contacts, means upon said drum for actuating said conducting members to successively break electrical connection between each of said conducting members and said drum upon rotation of said drum, and means for breaking said motor circuit concurrently with the successive breaking of electrical connection between each of said conducting members and said drum.

5. In an electrically operated mechanism for the remote control of a device requiring motive power to effect its operation, a motor for regulating said device, an element having a plurality of separate contacts and a circuit closing member for selectively engaging said contacts, a rotatable member of conducting material driven by said motor, a plurality of conducting members normally engaging said rotatable member, there being a conducting member corresponding to each one of said separate contacts of said element and electrically connected thereto, a circuit for said motor, means including an expansible and contractible resistance element for closing said motor circuit upon engagement of said circuit closing member with one of said contacts, means upon said rotatable member for actuating said conducting members to successively break electrical connection between each of said conducting members and said rotatable member upon rotation of said rotatable member, and means for breaking said motor circuit concurrently with the successive breaking of electrical connection between each of said conducting members and said rotatable member.

6. In an electrically operated mechanism for the remote control of a device requiring motive power to effect its operation, a motor for regulating said device, an element having a plurality of separate contacts and a circuit closing member for selectively engaging said contacts, a rotatable member of conducting material driven by said motor, a plurality of conducting members normally engaging said rotatable member, there being a conducting member corresponding to each one of said separate contacts of said element and electrically connected thereto, a circuit for said motor, a motor starting switch having a pair of relatively movable elements, said motor starting switch being adapted to close said motor circuit upon engagement of said circuit closing member with one of said contacts, means upon said rotatable member for actuating said conducting members to successively break electrical connection between each of said conducting members and said rotatable member upon rotation of said rotatable member, and means for causing said motor starting switch to be actuated to break said motor circuit concurrently with the successive breaking of electrical connection between each of said conducting members and said rotatable member.

7. In an electrically operated mechanism for the remote control of a device requiring motive power to effect its operation, a motor for regulating said device, an element having a plurality of separate contacts and a circuit closing member for selectively engaging said contacts, a rotatable member of conducting material driven by said motor, a plurality of conducting members normally engaging said rotatable member, there being a conducting member corresponding to each one of said separate contacts of said element and electrically connected thereto, a circuit for said motor, a motor starting switch having a pair of relatively movable elements, said motor starting switch being adapted to close said motor circuit upon engagement of said circuit closing member with one of said contacts, means upon said rotatable member for actuating said conducting members to successively break electrical connection between each of said conducting members and said rotatable member upon rotation of said rotatable member, and means for maintaining said motor starting switch in position to hold said motor circuit closed for intervals of time during the rotation of said rotatable member, and for causing said motor starting switch to be actuated to break said motor circuit concurrently with the successive breaking of electrical connection between each of said conducting members and said rotatable member.

8. In an electrically operated mechanism for the remote control of a device requiring motive power to effect its operation, a motor for regulating said device, an operating electrical circuit for said motor including a motor starting switch having a pair of relatively movable elements, a transformer, a primary circuit for said transformer, a remotely controlled electrical circuit including the secondary of said transformer, an element in said remotely controlled electrical circuit having a plurality of separate contacts and a circuit closing member for selectively engaging said contacts, a rotatable member of conducting material driven by said motor, a plurality of conducting members normally engaging said rotatable member, there being a conducting member corresponding to each one of said separate contacts of said element and electrically connected thereto, said rotatable member and said conducting members being included in said remotely controlled electrical circuit, means in said remotely controlled electrical circuit for actuating one of the movable elements of said motor starting switch to the closed position of said motor operating circuit upon engagement of said circuit closing member with one of said contacts, means operative upon the setting of said regulator motor into operation to actuate the other of said movable elements of the motor starting switch to break the primary circuit of said transformer and thus render said remotely controlled circuit dead, means upon said rotatable member for actuating said conducting members to successively break electrical connection between each of said conducting members and said rotatable member upon rotation thereof, and means for maintaining said motor starting switch in position to close said motor circuit during intervals, and for causing said motor starting switch to be actuated to break said motor circuit concurrently with the successive breaking of electrical connection between each of said conducting members and said rotatable member.

9. In an electrically operated mechanism for the remote control of a device requiring motive power to effect its operation, a motor for regulating said device, an operating electrical circuit for said motor including a motor starting switch having a pair of relatively movable elements, a transformer, a primary circuit for said transformer, a remotely controlled electrical circuit including the secondary of said transformer, an element in said remotely controlled electrical circuit having a plurality of separate contacts and a circuit closing member for selectively engaging said contacts, a drum of conducting material driven by said motor, a plurality of conducting members normally engaging said drum, there being a conducting member corresponding to each one of said separate contacts of said element and electrically connected thereto, said drum and said conducting members being included in said remotely controlled electrical circuit, means in said remotely controlled electrical circuit for actuating one of the movable elements of said motor starting switch to the closed position of said motor operating circuit upon engagement of said circuit closing member with one of said contacts, means operative upon the setting of said regulator motor into operation to actuate the other of said movable elements of the motor starting switch to break the primary circuit of said transformer and thus render said remotely controlled circuit dead, and means upon said drum for actuating said conducting members to successively break electrical connection between each of said conducting members and said drum upon rotation of said drum, said means operative upon the setting of said regulator motor into operation causing said motor starting switch to be actuated to break said motor circuit concurrently with the successive breaking of electrical connection between each of said conducting members and said drum.

10. In an electrically operated mechanism for the remote control of a device requiring motive power to effect its operation, a motor for regulating said device, an operating electrical circuit for said motor including a motor starting switch having a pair of relatively movable elements, a transformer, a primary circuit for said transformer, a remotely controlled electrical circuit including the secondary of said transformer, an element in said remotely controlled electrical circuit having a plurality of separate contacts and a circuit closing member for selectively engaging said contacts, a drum of conducting material driven by said motor, a plurality of conducting members normally engaging said drum, there being a conducting member corresponding to each one of said separate contacts of said element and electrically connected thereto, said drum and said conducting members being included in said remotely controlled electrical circuit, means in said remotely controlled electrical circuit for actuating one of the movable elements said motor starting switch to the closed position of said motor operating circuit upon engagement of said circuit closing member with one of said contacts, means operative upon the setting of said regulator motor into operation to actuate the other of said movable elements of the motor starting switch to break the primary circuit of said transformer and thus render said remotely controlled circuit dead, and means upon said drum for actuating said conducting members to successively break electrical connection between each of said conducting members and said drum upon rotation of said drum, said means operative upon the setting of said regulator motor into operation maintaining said motor starting switch in position to close said motor circuit during intervals, and causing said motor starting switch to be actuated to break said motor circuit concurrently with the successive breaking of electrical connection between each of said conducting members and said drum.

11. In an electrically operated mechanism for the remote control of a device requiring motive power to effect its operation, a motor for regulating said device, an element having a plurality of separate contacts and a circuit closing member for selectively engaging said contacts, a conducting device driven by said motor, a plurality of conducting members for engaging said conducting device, there being a conducting member corresponding to each one of said separate contacts of said element and electrically connected thereto, a circuit for said motor, a motor starting switch having a movable element, said motor starting switch being adapted to close said motor circuit upon engagement of said circuit closing member with one of said contacts, and electrical connection between each of said conducting members and said conducting device being successively broken upon actuation of said conducting device, and means for maintaining said motor starting switch in position to hold said motor circuit closed for intervals of time during the actuation of said conducting device and for causing said motor starting switch to be actuated to break said motor circuit concurrently with the successive breaking of electrical connection between each of said conducting members and said conducting device.

EVERETT H. WHITE.